(12) United States Patent
Bonnain

(10) Patent No.: US 11,891,250 B2
(45) Date of Patent: Feb. 6, 2024

(54) FLEXIBLE PITCH PRODUCT METERING SYSTEM

(71) Applicant: WestRock Packaging Systems, LLC, Atlanta, GA (US)

(72) Inventor: Jean-Christophe Bonnain, Châteauroux (FR)

(73) Assignee: WestRock Packaging Systems, LLC, Atlanta, GA (US)

( * ) Notice: Subject to any disclaimer, the term of this patent is extended or adjusted under 35 U.S.C. 154(b) by 86 days.

(21) Appl. No.: 17/612,143

(22) PCT Filed: May 15, 2020

(86) PCT No.: PCT/US2020/033116
§ 371 (c)(1),
(2) Date: Nov. 17, 2021

(87) PCT Pub. No.: WO2020/236583
PCT Pub. Date: Nov. 26, 2020

(65) Prior Publication Data
US 2022/0250851 A1     Aug. 11, 2022

Related U.S. Application Data

(60) Provisional application No. 62/849,253, filed on May 17, 2019.

(51) Int. Cl.
*B65G 19/02* (2006.01)
*B65G 47/08* (2006.01)
(Continued)

(52) U.S. Cl.
CPC ............ *B65G 19/02* (2013.01); *B65B 35/243* (2013.01); *B65B 59/001* (2019.05);
(Continued)

(58) Field of Classification Search
CPC ...... B65G 19/02; B65G 19/245; B65G 47/08; B65G 47/84; B65G 47/846; B65B 59/001; B65B 59/005; B65B 59/02; H02K 41/02
(Continued)

(56) References Cited

U.S. PATENT DOCUMENTS 4,892,186 A * 1/1990 Frei .................. B65G 47/082
198/867.13
5,695,041 A * 12/1997 Kouda ............... B65G 47/846
198/459.2
(Continued)

FOREIGN PATENT DOCUMENTS

WO    WO 99/65776    *  6/1999

*Primary Examiner* — Douglas A Hess
(74) *Attorney, Agent, or Firm* — Brian J. Goldberg; Rohini K. Garg

(57) ABSTRACT

A product management system (100) includes—a continuous first track (104), including a lug queuing section (108), a lug engagement section (110), and a product engagement section (112), each section being configured and adapted to effectuate specific lug movement steps, —a continuous chain (116) partially following the track configured and adapted to actuate lugs (106) about at least a portion of the track, —a series of lugs (106) moveably disposed along the track (104) configured for moving a product along the product engagement section of the track, —a star wheel (120) disposed at the lug engagement section (110) of the track (104) configured for metering lugs (106) to engage the chain (116) from the queuing section (108) of the track (104) and to control a variable pitch between each of the lugs along the transferring chain, —and a magnetism source (122) configured to direct the lugs (106) to the queuing section (108), and to the end of the queuing section (108).

20 Claims, 7 Drawing Sheets

(51) Int. Cl.
  *B65G 47/84* (2006.01)
  *B65B 59/02* (2006.01)
  *H02K 41/02* (2006.01)
  *B65B 59/00* (2006.01)
  *B65B 35/24* (2006.01)
  *B65G 19/24* (2006.01)

(52) U.S. Cl.
  CPC ............ *B65B 59/005* (2013.01); *B65B 59/02* (2013.01); *B65G 19/245* (2013.01); *B65G 47/08* (2013.01); *B65G 47/846* (2013.01)

(58) Field of Classification Search
  USPC ..................................... 198/443, 459.2, 679
  See application file for complete search history.

(56) References Cited

U.S. PATENT DOCUMENTS

| | | | |
|---|---|---|---|
| 5,799,934 A * | 9/1998 | Kouda | B65G 17/32 |
| | | | 198/803.14 |
| 6,713,899 B1 * | 3/2004 | Greubel | H02K 41/031 |
| | | | 310/12.18 |
| 9,061,838 B2 * | 6/2015 | van de Loecht | B65G 54/02 |
| 9,809,396 B2 * | 11/2017 | Joehren | B65G 47/088 |
| 10,781,049 B2 * | 9/2020 | Christensen | B65G 17/065 |
| 10,968,048 B2 * | 4/2021 | Niehr | B65G 47/847 |

* cited by examiner

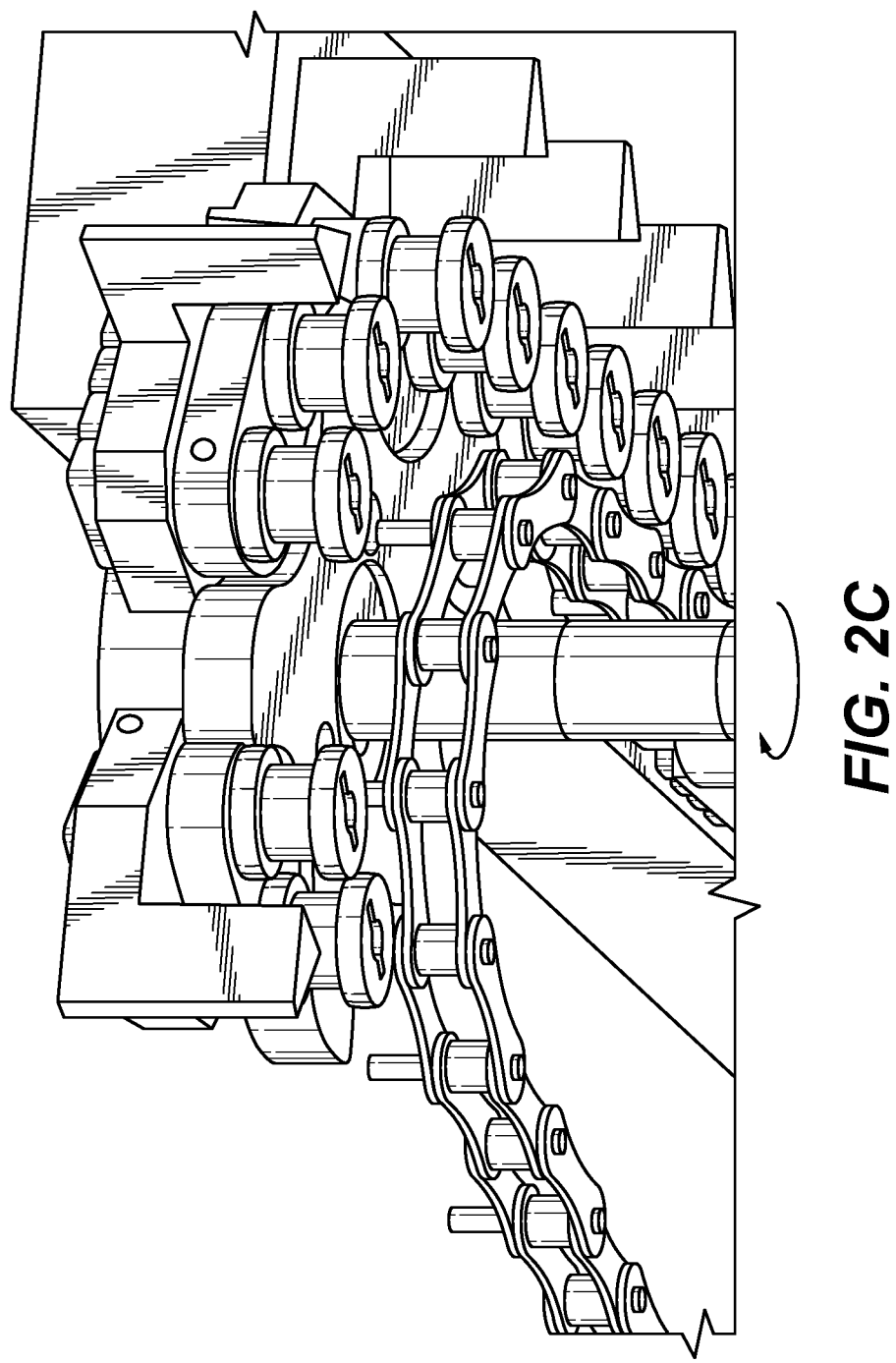

FLEXIBLE PITCH PRODUCT METERING SYSTEM

BACKGROUND

Technological Field

The present disclosure relates to a product metering system, and more particularly to a product metering system with a flexible product pitch.

Description of Related Art

In product moving equipment and systems, it is common and necessary to space products as required by downstream packaging steps. In the past, a fixed pitch product conveyor was used, that required stopping and changing over of tools in order to get the system ready for a different size of package, or a different sized product. This is often not desirable.

Although, the conventional methods and systems have generally been considered satisfactory for their intended purpose. However, there is still a need in the art for a product metering system having improved pitch control and improved reliability. The present disclosure may provide a solution for at least one of these remaining challenges.

SUMMARY OF THE INVENTION

A product management system includes a continuous first track, including a lug queuing section, a lug engagement section, and a product engagement section, each section being configured and adapted to effectuate specific lug movement steps, a continuous chain partially following the first track configured and adapted to actuate lugs about at least a portion of the track, a series of lugs moveably disposed along the track configured for moving a product along the product engagement section of the track, a star wheel disposed at the lug engagement section of the track configured for metering lugs to engage the chain from the queuing section of the track and to control a variable pitch between each of the lugs along the transferring chain, and a magnetism source configured to direct the lugs to the queuing station.

The chain and track can be disposed within a panel and the chain is disposed within a secondary channel within the panel located below the first track. The first track can be oriented in a horizontal plane. Each lug can include an arm configured and adapted to engage the product.

The star wheel is programmed to move independent of the chain. The star wheel is actuated by a controller for controlling pitch between each of the lugs along the chain. The star wheel is disposed on and actuated by a vertical shaft, wherein a controller programmed to rotate the vertical shaft at a rate corresponding with a desired spacing between each of the lugs along the product engagement section of the first track. The star wheel includes a series of slots configured to complement a base of the lug.

The chain includes a series of vertically aligned members configured and adapted to engage the lugs in order to drive the lugs along the first track. Each lug includes a cylindrical portion disposed within the first track configured and adapted to hold the position the lug along the first track. The cylindrical portion of each lug includes a flange protruding radially therefrom. The chain includes a series of vertically aligned members, wherein each vertically aligned member is configured and adapted to engage a leading cylindrical member protruding from a base of each lug in order to drive the lugs along the first track. Each lug includes a trailing cylindrical member configured and adapted to improve stability of each lug within the first track.

A disengagement mechanism is disposed along the first track configured to disengage the lugs from the chain and direct the lugs to the lug queuing section. Each lug includes a magnet reacting material and the magnetism source configured and adapted to bias each lug towards a lug queuing section end proximate to the lug engagement section. The product management system can also include conveyor configured for feeding products to the product engagement section.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein:

FIG. 2c is a perspective of the coupling between the lugs and star wheel of FIG. 1, showing the star wheel in a third position.

DETAILED DESCRIPTION

Figure 1:
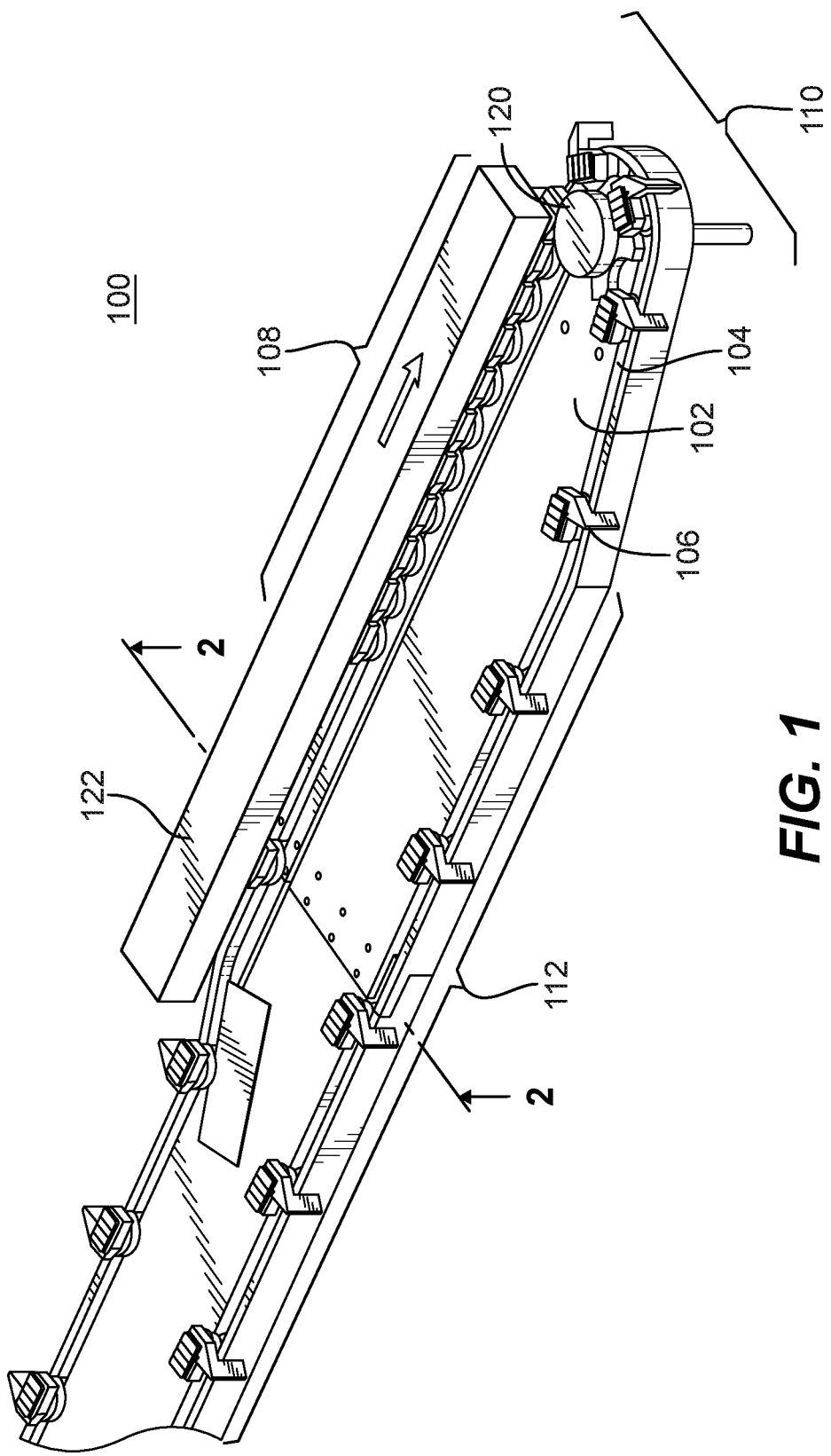
FIG. 1 is a perspective view of a product metering system.

Reference will now be made to the drawings wherein like reference numerals identify similar structural features or aspects of the subject invention. For purposes of explanation and illustration, and not limitation, a partial view of an exemplary embodiment of a product management system having a flexible pitch in accordance with the invention is shown in FIG. 1 and is designated generally by reference character 100. Other embodiments of the product management system in accordance with the invention, or aspects thereof, are provided in FIGS. 2a-2c, as will be described. The methods and systems of the invention can be used to seamlessly move product at a desired pitch along a track without having to stop the system and provide changeover.

FIG. 1 shows a product management system 100 including a panel 102 having a first continuous track 104 therein. The panel can be constructed of multiple panels, wherein each panel includes a portion of the track 104. The first track 104 provides a pathway and support for product engaging lugs 106. The track 104 includes a lug queuing section 108, a lug engagement section 110, and a product engagement section 112. In each section, the lugs 106 are meant to perform a different action, as described in further detail below.

Figure 1A:
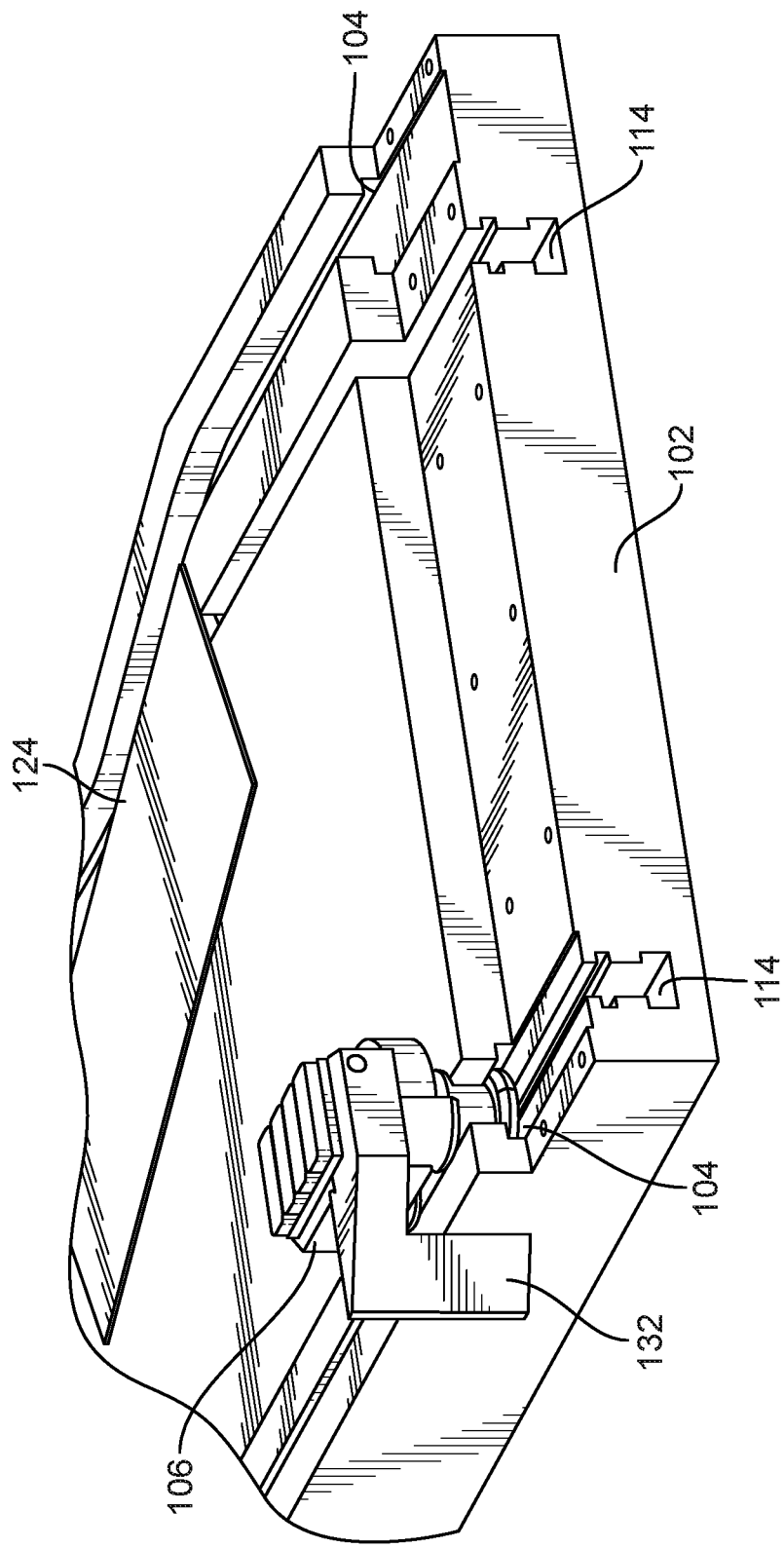
FIG. 1a is a perspective view of FIG. 1, showing a section of a panel removed, exposing the first track.

FIG. 1a shows a second continuous track 114. The second continuous track 114 follows the first continuous track 104 and located below the first track 104. The second continuous track 114 continues in a straight line while the first track 104 branches off to the lug queuing section 108. The second track 114 houses a continuous chain 116 (shown in FIGS. 1b and 1c). The chain moves the lugs 106 about the product engagement portion of the track 112. The lugs 106 are moveably disposed along the first track 104 and configured for driving or pushing a product along the product engagement section 112. A conveyor (not shown) for feeding products and supporting the products, is be placed next to the panel and next to the product engagement section 112, so that the product management system 100 can be part of a larger product management system, including other product management apparatuses.

Referring further to FIG. 1, a star wheel 120 is located at the lug engagement section 110 of the first track 104. As the star wheel 120 turns, it engages each lug 106. The rate at which the star wheel 120 turns is changed as required by the types, and sizes of products as well as the rate of products coming into the system. The star wheel 120 is actuated independent of the chain 116. A magnetism source 122 is located proximate or within the queuing section 108. The magnetism source directs or pulls the lugs 106 to the queuing section 108, and to the end of the queuing section. When the magnetism source 122 is turned on or engaged, the magnetic material 128 in each of the lugs reacts and is attracted to the magnetism source 122. A disengagement mechanism 124, such as wedge, can be disposed within the first track 104 to disengage the lugs 106 from the chain 116 and direct the lugs 106 to the lug queuing section 108. The wedge 124 forces each lug 106 to slip from the chain 116 and keep moving into the queuing section 108 while the chain 116 keeps moving in the same direction.

Figure 1B:
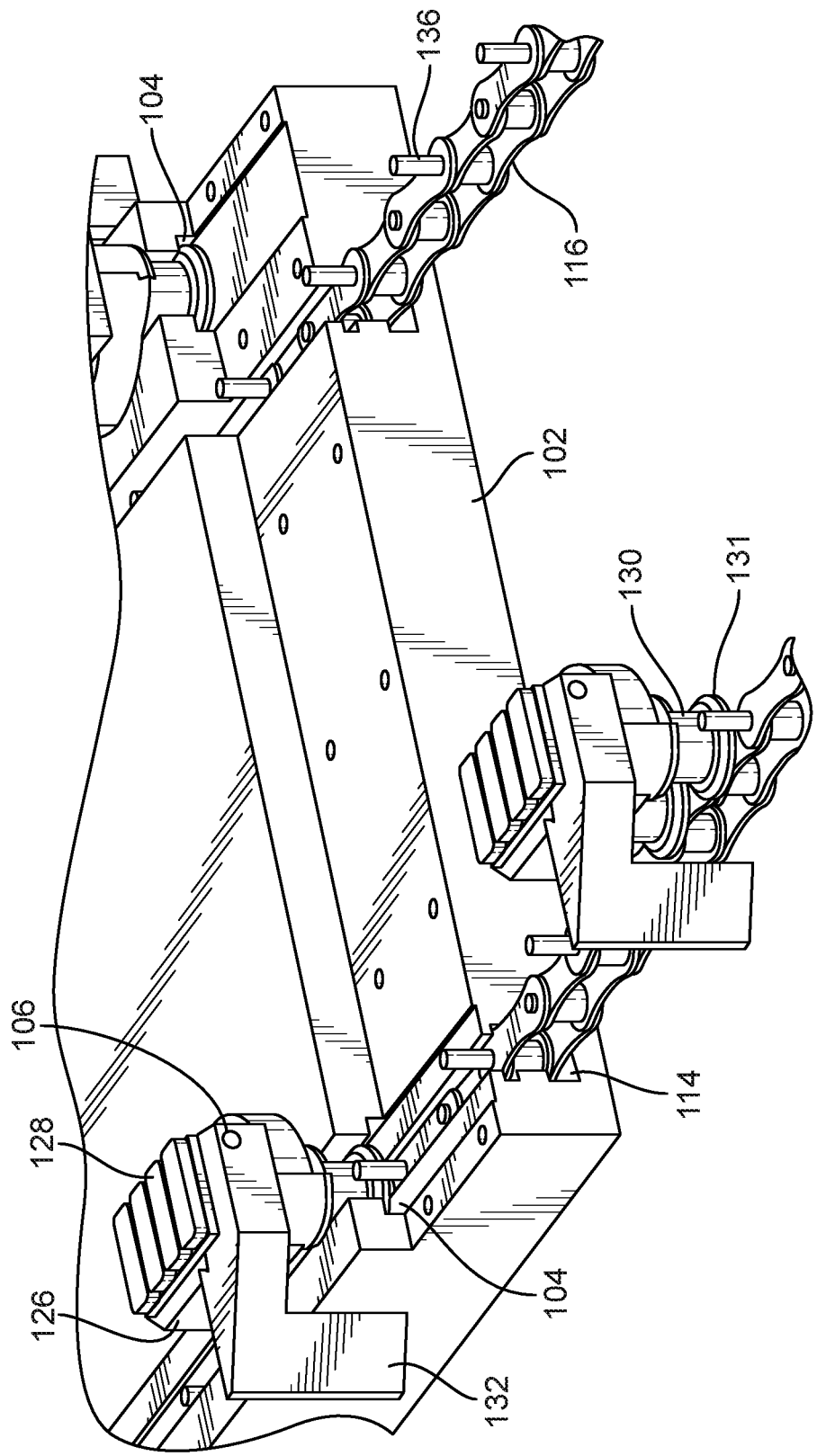
FIG. 1b is a perspective view of FIG. 1, showing a section of the panel removed, exposing the chain.
Figure 1C:
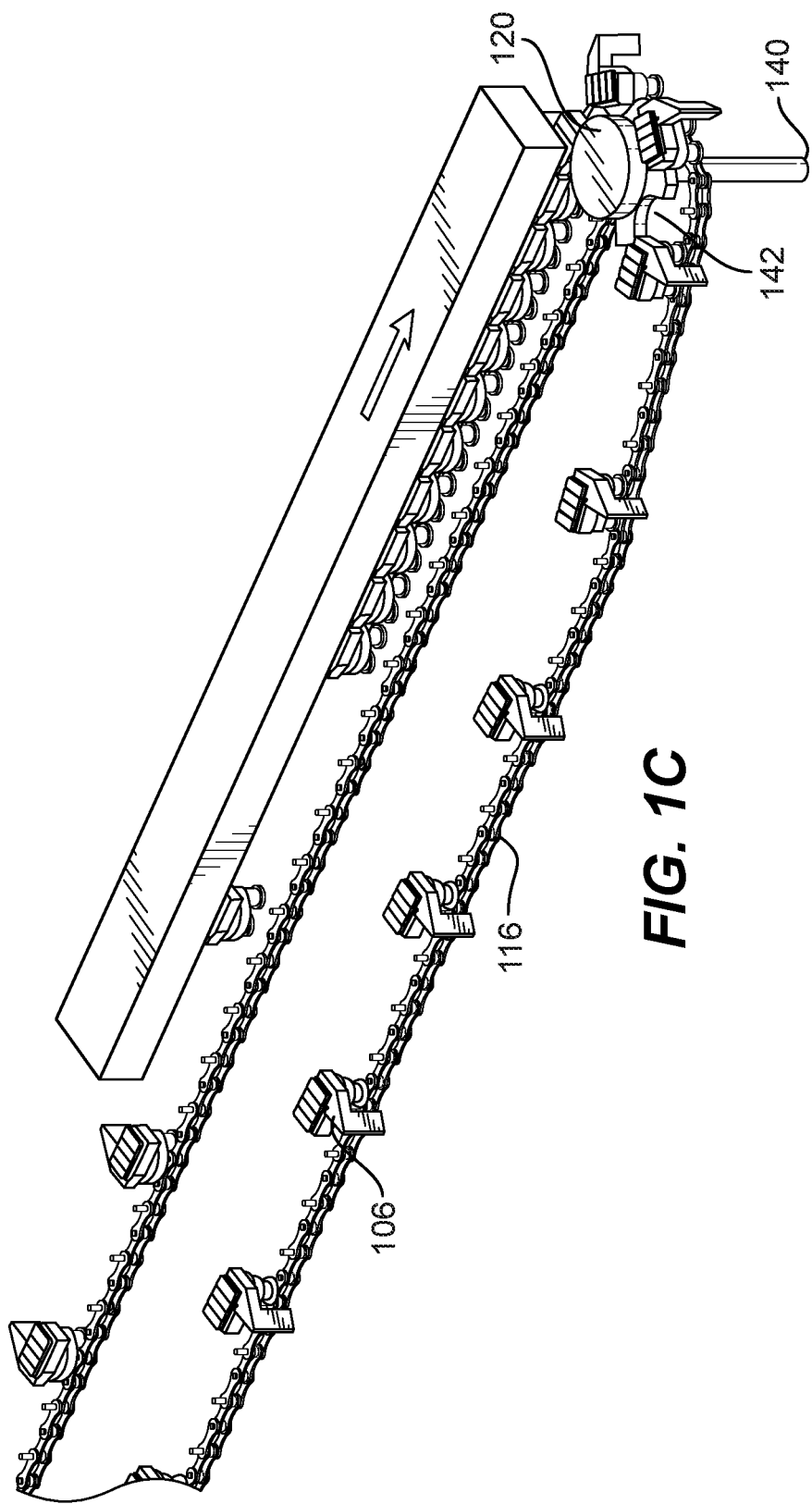
FIG. 1c is a perspective view of FIG. 1, showing the panels removed, exposing the entire chain.

FIG. 1b, each lug 106 includes a base 126, a magnetic material 128, a cylindrical member 130 protruding from the base 126, and an arm 132 configured and adapted to engage the product. Each cylindrical member 130 disposed within the first track 104 is configured and adapted to hold the position the lug 106 along the first track 104. The cylindrical portion 130 of each lug includes a flange 131 protruding radially therefrom. The cylindrical portion 130 and flange 131 act as a horizontal train wheel disposed between two train rails. The cylindrical portion 130 can also include a bearing. The chain 116 includes a series of vertically aligned members 136, wherein each vertically aligned member 136 is configured and adapted to engage the cylindrical member 130 in order to drive the lugs 106 along the first track 104.

Figure 2A:
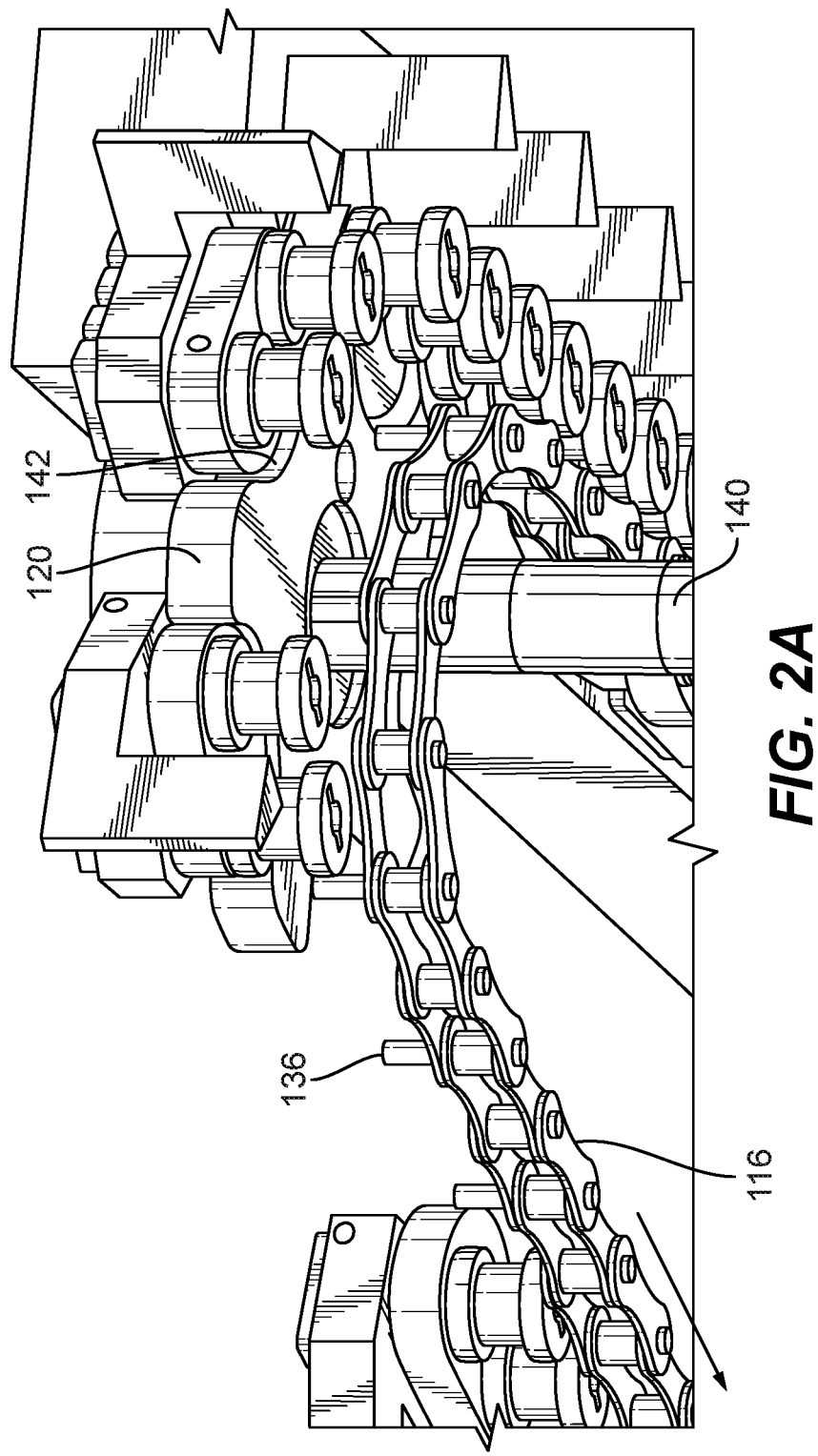
FIG. 2a is a perspective of the coupling between the lugs and star wheel of FIG. 1, showing the star wheel in a first position.
Figure 2B:
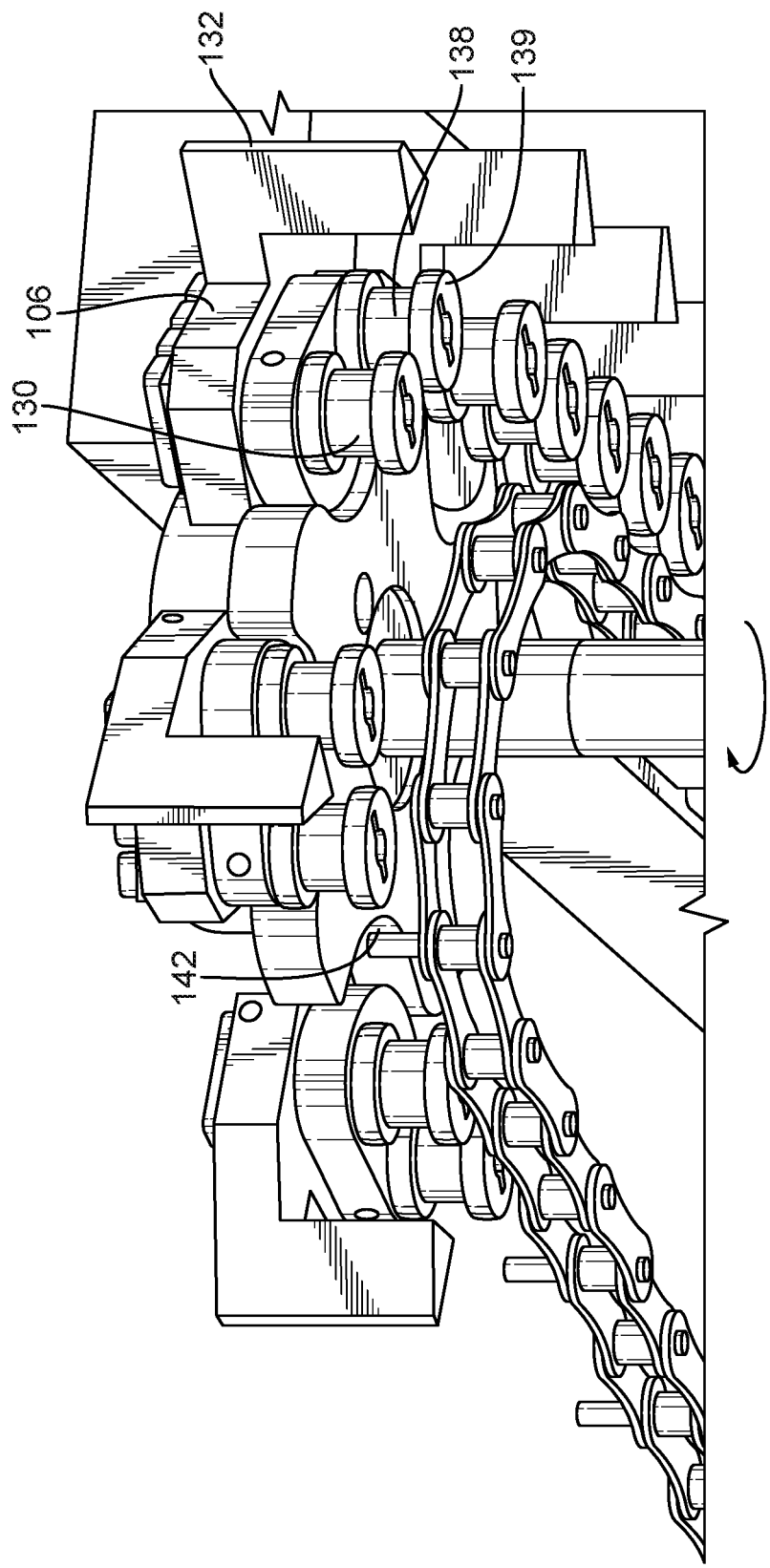
FIG. 2b is a perspective of the coupling between the lugs and star wheel of FIG. 1, showing the star wheel in a first position.

Referring further to FIG. 2a-2c, the star wheel 120 is disposed on and actuated by a vertical shaft 140. A controller (not shown) connected to the vertical shaft 140 is programmed to rotate the vertical shaft 140. The shaft 140 and star wheel 120 are rotated at a rate which controls the desired spacing between each of the lugs 106 along the product engagement section 110 of the first track 104. The figures show a progression of the lugs 106 and the star wheel 140. The star wheel 120 first engages the lug 106 at the end of the queueing section 108. The star wheel 120 includes a series of slots 142 configured to complement the base 126 of the lug. As the star wheel 120 turns, the lug 106 is moved to be in the path of the vertical member 136 of the chain 116. At this point, the chain 116 engages the lug 106, and no portion of the star wheel 120 is blocking the lug 106 from moving forward with the chain 116, at the speed of the chain 116. The star wheel 120 is programmed to move independent of the chain 116. Each lug 106 also includes a trailing cylindrical member 138 with a flange 139 configured and adapted to improve stability of each lug 106 within the first track 104, and ensure the lugs 106 do not spin in place, and that the vertical member 136 of the chain is not able to slip by the lug.

The methods and systems of the present disclosure, as described above and shown in the drawings, provide for a product management system with superior properties including increased reliability, stability, and pitch flexibility. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A product management system comprising:
a continuous first track, including a lug queuing section, a lug engagement section, and a product engagement section, each section being configured and adapted to effectuate specific lug movement steps;
a continuous chain partially following the continuous first track configured and adapted to actuate lugs about at least a portion of the continuous first track;
a series of lugs moveably disposed along the continuous first track configured for moving a product along the product engagement section of the continuous first track;
a star wheel disposed at the lug engagement section of the continuous first track configured for metering lugs to engage the chain from the queuing section of the track and to control a variable pitch between each of the lugs along the transferring chain;
and a magnetism source disposed proximate or within the queuing sections, wherein the magnetism source is configured to pull the lugs to the queuing section when activated.

2. The product management system of claim 1, wherein the continuous chain and continuous first track are disposed within a panel.

3. The product management system of claim 1, wherein the first track is oriented in a horizontal plane.

4. The product management system of claim 1, wherein each lug includes an arm configured and adapted to engage the product.

5. The product management system of claim 1, wherein the star wheel is programmed to move independent of the chain.

6. The product management system of claim 5, wherein the star wheel is actuated by a controller for controlling pitch between each of the lugs along the chain.

7. The product management system of claim 1, wherein the star wheel is disposed on and actuated by a vertical shaft, wherein a controller programmed to rotate the vertical shaft at a rate corresponding with a desired spacing between each of the lugs along the product engagement section of the first track.

8. The product management system of claim 1, wherein the star wheel includes a series of slots configured to complement a base of the lug.

9. The product management system of claim 1, wherein the chain includes a series of vertically aligned members configured and adapted to engage the lugs in order to drive the lugs along the first track.

10. The product management system of claim 1, wherein each lug includes a cylindrical portion disposed within the first track configured and adapted to hold the position the lug along the first track.

11. The product management system of claim 10, wherein the cylindrical portion of each lug includes a flange protruding radially therefrom.

12. The product management system of claim 1, wherein the chain includes a series of vertically aligned members, wherein each vertically aligned member is configured and adapted to engage a leading cylindrical member protruding from a base of each lug in order to drive the lugs along the first track.

13. The product management system of claim 12, wherein each lug includes a trailing cylindrical member configured and adapted to improve stability of each lug within the first track.

14. The product management system of claim 1, including a disengagement mechanism disposed along the first track configured to disengage the lugs from the chain and direct the lugs to the lug queuing section.

15. The product management system of claim 1, wherein each lug includes a magnet reacting material.

16. The product management system of claim 1, wherein the magnetism source configured and adapted to bias each lug towards a lug queuing section end proximate to the lug engagement section.

17. The product management system of claim 1, further comprising conveyor configured for feeding products to the product engagement section.

18. The product management system of claim 1, wherein the magnetism source is directly attached to the continuous first track.

19. A product management system comprising:
- a continuous first track, including a lug queuing section, a lug engagement section, and a product engagement section, each section being configured and adapted to effectuate specific lug movement steps;
- a continuous chain partially following the continuous first track configured and adapted to actuate lugs about at least a portion of the continuous first track, wherein the continuous chain and the continuous first track are disposed within a panel such that the chain is disposed within a secondary channel within the panel located below the continuous first track;
- a serious of lugs moveably disposed along the continuous first track configured for moving a product along the product engagement section of the continuous first track;
- a star wheel disposed at the lug engagement section of the continuous first track configured for metering lugs to engage the chain from the queuing section of the track and to control a variable pitch between each of the lugs along the transferring chain; and
- a magnetism source configured to direct the lugs to the queueing sections.

20. A product management system comprising:
- a panel including:
- a first continuous track, including a lug queuing section, a lug engagement section, and a product engagement section, each section being configured and adapted to effectuate specific lug movement steps;
- a second continuous track partially following the first continuous track located below the first track;
- a continuous transferring chain disposed within the second continuous track configured and adapted to actuate lugs about at least a portion of the track;
- a series of lugs moveably disposed along the track configured for effectuating a product along the product engagement section of the track, wherein each lug includes a base, a magnet, a cylindrical member protruding from the base and disposed within the first continuous track, and an arm configured and adapted to engage the product;
- a star wheel disposed at the lug engagement section of the first track configured for metering lugs in order to engage the transferring chain from the queuing section of the track, wherein the star wheel is actuated independent of the transferring chain; and
- a magnetism source configured to direct the lugs to the queuing section.

\* \* \* \* \*